Patented Oct. 6, 1925.

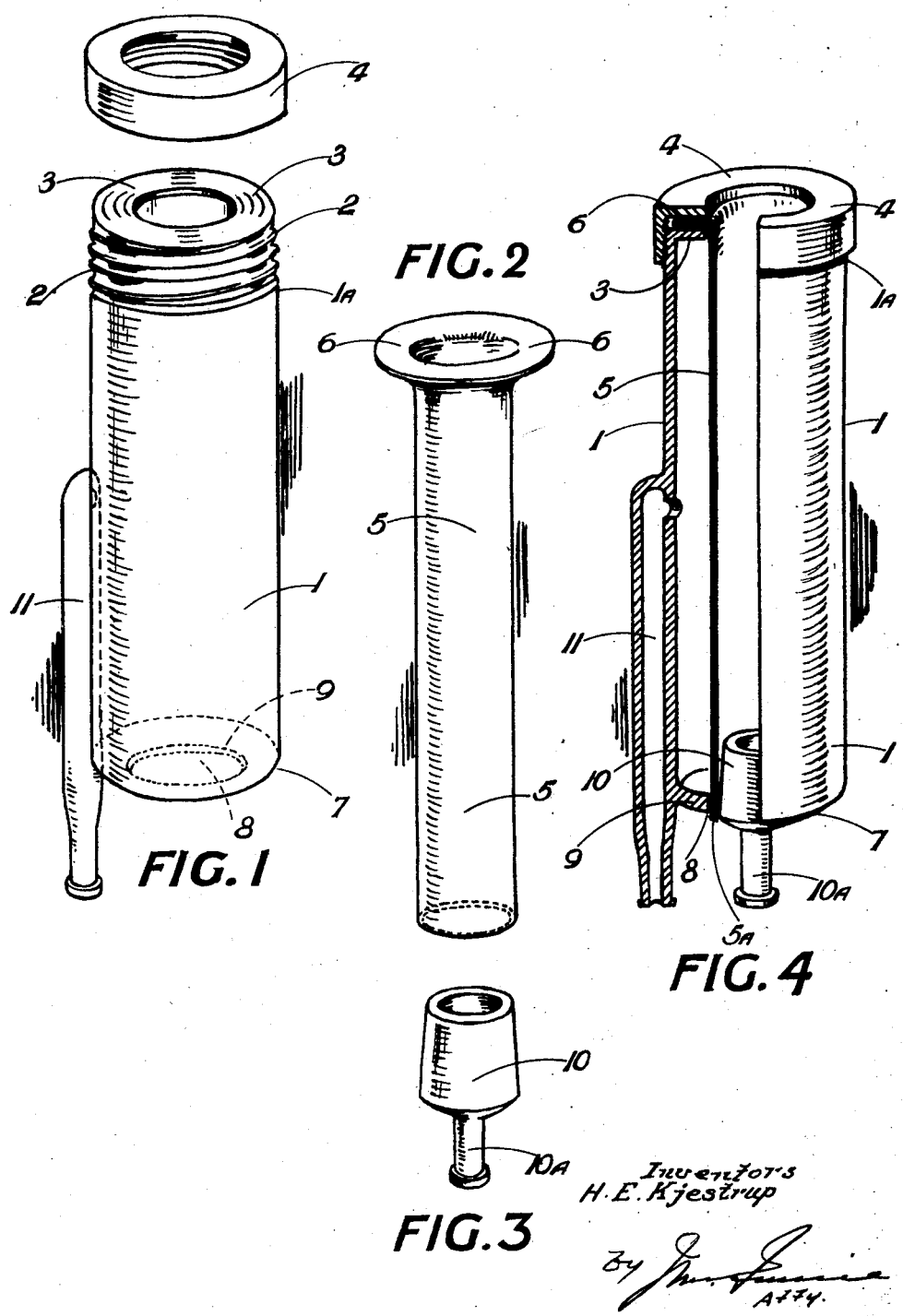

1,556,559

UNITED STATES PATENT OFFICE.

HENRY ENOVALD KJESTRUP, OF RANGITUMAU, NEW ZEALAND.

MILKING-MACHINE TEAT CUP.

Application filed June 5, 1924. Serial No. 718,129.

*To all whom it may concern:*

Be it known that I, HENRY ENOVALD KJESTRUP, a subject of King George V, of Great Britain, residing at Rangitumau, Masterton, in the Dominion of New Zealand, have invented certain new and useful Improvements in Milking-Machine Teat Cups, of which the following is a specification.

This invention relates to teat cups for milking machines in which an outer casing is employed having a rubber inflation therein, adapted to be secured to the upper and lower ends of said outer casing.

The object of my invention is to provide an improved type of teat cup giving increased efficiency during use, together with simplicity and quickness in handling.

A further object of my invention is to obviate the present necessity of unduly stretching the upper end of the rubber inflation when placing it in position for retention within the teat cup casing, the inflation when in position being nominally of a size that it will bear on the whole teat of a cow, thereby giving a more natural effect during milking, and also securing a greater benefit from the suction of the milking machine.

In the drawings accompanying this specification:—

Figure 1 indicates the teat cup in elevation, the cap member thereof being unscrewed to illustrate the inwardly disposed flange at the upper end of the casing member.

Figure 2 is a view of the rubber inflation.

Figure 3 is a view of the tapered nipple member.

Figure 4 is a view of the invention partly in section, indicating the method of securing the rubber inflation member to the upper and lower ends of the casing.

The teat cup casing 1 is of similar construction to that at present in use, but having preferably a larger bore. One end 1ᴬ of the casing 1 is provided with a screw thread 2 and has an inwardly disposed flange as at 3; there is a threaded cap member 4, which is adapted to engage the screwed upper end of the casing member, and be retained thereon. The rubber inflation 5 consists of a member as shown, the member having its upper end flared as indicated at 6; the inflation is placed within the casing member 1 (Figure 4), and when in position its upper flared end 6 is adapted to overlap the inwardly disposed flange 3 of the casing member 1, so that when the threaded cap member 4 is screwed over the upper end 1ᴬ of the casing member 1, the flared end 6 of the inflation 5 will be held firmly in position as indicated in Figure 4, and form an air-tight joint.

A groove (not shown) may be made in the inwardly disposed flange 3 of the teat cup casing, and a downwardly projecting rib (not shown) may be made on the flared end 6 of the inflation 5, so that said rib may be passed into the said groove to assist in securing the inflation when the threaded cap 4 of the casing member 1 is attached thereto.

The lower end 7 of the casing 1 is provided with an opening 8 to allow the withdrawal of the inflation, the said opening 8 having an inwardly disposed flange 9. When it is desired to attach the lower end 5ᴬ of the inflation 5 to the lower end 7 of the casing 1, the end of the inflation is withdrawn outside the bottom of the casing and retained by any suitable means, and a tapered nipple 10 is placed in the end of said inflation 5 (Figure 4). The inflation is now released and allowed to return within the casing 1 and the inflation is retained in the position indicated, by the tapered nipple 10 bearing against the said inwardly disposed flange 9 of the casing member 1. The usual milk tube (not shown) is then attached to the free end 10ᴬ of the said tapered nipple 10.

In my invention I place the pulsation tube nipple 11 about half way up the casing member 1 (see Figure 1), the connection being made so that a flush surface is presented within the casing member.

This construction enables the pulsation of the machine to slightly draw the rubber inflation member 5 away from the end of the cow's teat, and by so doing gives a better vent for the milk to fill in the cow's teat ready for the suction of the machine to act upon.

It will be understood from the foregoing description that the upper end of the inflation not being unduly distended will fit snugly over the whole teat of the cow, thereby securing the benefit of practically the whole of the suction of the milking machine; this result to my knowledge is not obtainable with the present method of attaching the inflation to the upper end of the casing member of a teat cup.

What I claim as new and desire to secure by Letters Patent is:—

A teat cup, comprising a hollow casing, an elastic inflation tube arranged therein, said tube being of uniform uninterrupted interior area throughout its length, and a tapered nipple to hold the lower end of the tube relative to the casing, said nipple being held in place through the longitudinal elesticity of the tube, and a pulsator tube formed in part by the casing and opening into the latter at substantially a mid-length point thereof.

In testimony whereof, I have signed my name to this specification at Wellington, New Zealand this 8th day of April 1924.

HENRY ENOVALD KJESTRUP.